United States Patent [19]

Okamoto

[11] 4,286,554
[45] Sep. 1, 1981

[54] INTAKE SYSTEM OF AN INTERNAL COMBUSTION ENGINE

[75] Inventor: Takamitsu Okamoto, Toyota, Japan

[73] Assignee: Toyota Jidosha Kogyo Kabushiki Kaisha, Toyota, Japan

[21] Appl. No.: 71,372

[22] Filed: Aug. 30, 1979

[30] Foreign Application Priority Data

Jun. 25, 1979 [JP] Japan .................................. 54-79039

[51] Int. Cl.³ ................................................ F01L 3/00
[52] U.S. Cl. ............................ 123/188 M; 123/52 M
[58] Field of Search ........................ 123/52 M, 188 M

[56] References Cited

U.S. PATENT DOCUMENTS

| | | | |
|---|---|---|---|
| 3,429,303 | 2/1969 | Roberts | 123/188 M |
| 3,561,408 | 2/1971 | Weiand | 123/188 M |
| 3,744,463 | 7/1973 | McFarland, Jr. | 123/52 M |
| 3,945,363 | 3/1976 | Elsbett et al. | 123/188 M |

FOREIGN PATENT DOCUMENTS

| | | | |
|---|---|---|---|
| 1259484 | 1/1972 | United Kingdom | 123/188 M |
| 324404 | 11/1976 | U.S.S.R. | 123/188 M |

*Primary Examiner*—P. S. Lall
*Attorney, Agent, or Firm*—Kenyon & Kenyon

[57] ABSTRACT

An intake system of an internal combustion engine having a helically-shaped intake port comprising a substantially straight inlet passage portion and a helical portion. The intake manifold comprises substantially straight manifold branches, each being connected to the corresponding inlet passage portion. The ratio of the sum of the length of the inlet passage portion and the length of the manifold branch to the cross-sectional area of the inlet open end of the inlet passage portion is greater than 0.7 cm$^{-1}$.

10 Claims, 10 Drawing Figures

INTAKE SYSTEM OF AN INTERNAL COMBUSTION ENGINE

DESCRIPTION OF THE INVENTION

The present invention relates to an intake system of an internal combustion engine.

Particularly in a compression-ignition type internal combustion engine, in order to create a strong swirl motion in the combustion chamber of an engine at the time of the intake stroke, a helically-shaped intake port comprising a substantially straight inlet passage portion and a helical portion is used. However, even if such a helically-shaped intake port is applied to a spark-ignition type gasoline engine and, in addition, a slight change of the construction of the helically-shaped intake port is effected so as to create a swirl motion of the strength necessary to obtain a good combustion when the engine is operating under a light load, since the engine speed normally used in a gasoline engine is considerably greater than that normally used in a compression-ignition type engine, the flow resistance to which the mixture flowing in the helically-shaped intake port is subjected becomes large in a gasoline engine. As a result, the volumetric efficiency is reduced when the gasoline engine is operating at a high speed under a heavy load.

In addition, particularly in a multi-cylinder internal combustion engine, there is a problem in that a uniform swirl motion cannot be created in each cylinder, even if each of the intake ports is merely shaped in the form of a helically-shaped intake port.

An object of the present invention is to provide an intake system capable of creating a uniform swirl motion in each cylinder and, also, capable of creating a strong swirl motion in the combustion chamber when an engine is operating at a low speed, while ensuring a high volumetric efficiency when the engine is operating at a high speed under a heavy load.

According to the present invention, there is provided an internal combustion engine having a cylinder head and an intake manifold fixed onto the cylinder head, the cylinder head including therein at least one helically-shaped intake port. The helical portion of each port has an open outlet end and an intake valve arranged at the open outlet end and is defined by an upper wall and a peripheral side wall which extends circumferentially about an axis of said intake valve. The intake port also has a substantially straight inlet passage portion tangentially connected to the helical portion and having an open inlet end, the inlet passage portion being defined by an upper wall, a bottom wall, a first side wall arranged at a position near the axis of said intake valve, and a second side wall arranged at a position remote from the axis of the intake valve and connected to the peripheral side wall of the helical portion. The intake manifold comprises a manifold inlet portion and a substantially straight manifold outlet portion connected to the open inlet end of the inlet passage portion, and the ratio of the sum of the length of the inlet passage portion and the length of the manifold outlet portion to the cross-sectional area of the open inlet end is about 0.7 cm$^{-1}$.

The present invention may be more fully understood from the description of a preferred embodiment of the invention set forth below, together with the accompanying drawings.

DESCRIPTION OF A PREFERRED EMBODIMENT

Figure 1:
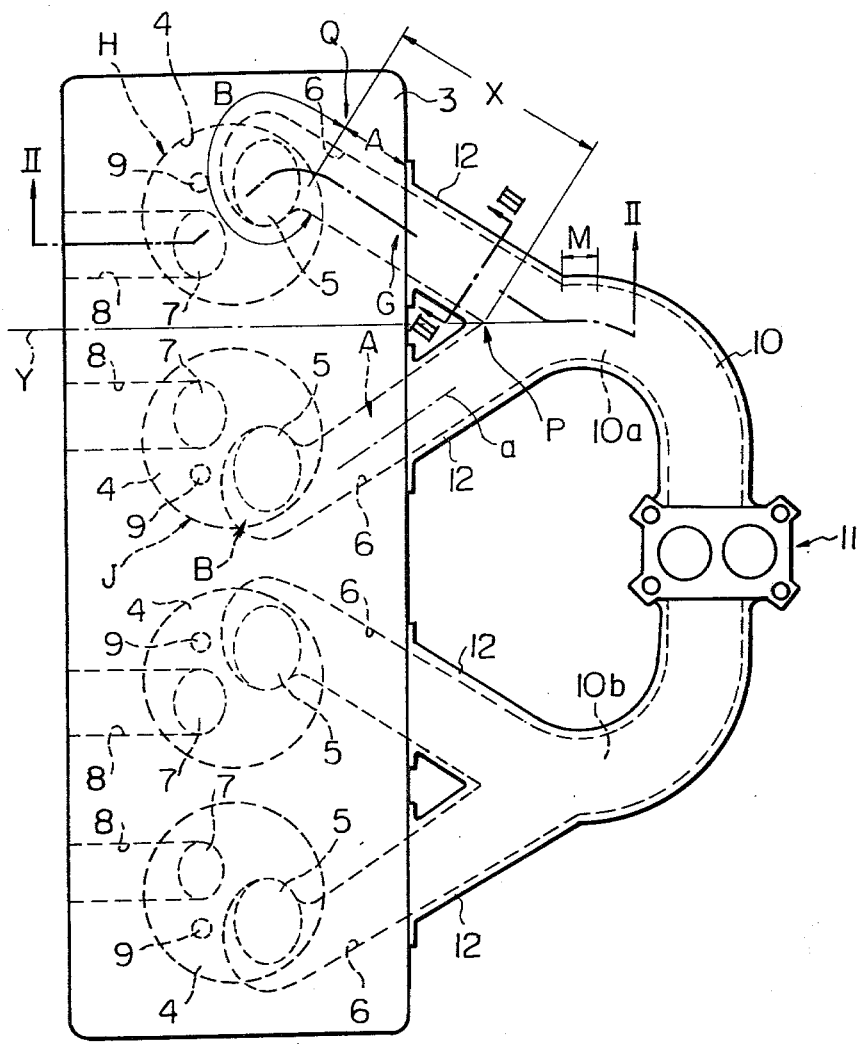
FIG. 1 is a plan view of an internal combustion engine according to the present invention.
Figure 2:
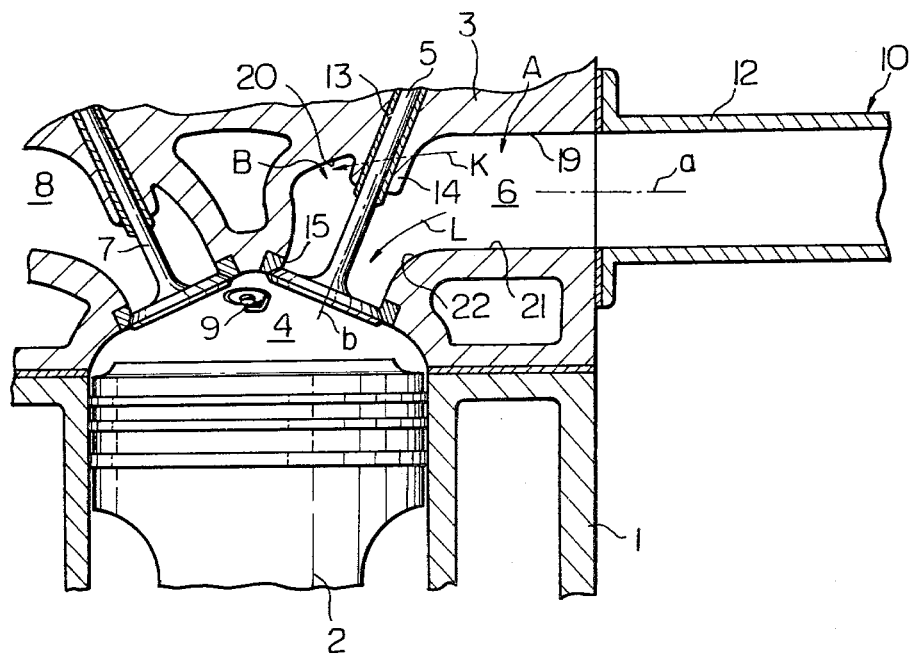
FIG. 2 is a cross-sectional side view taken along the line II—II in FIG. 1.

Referring to FIGS. 1 and 2, a cylinder block 1 has a piston 2 movable reciprocally therein. A cylinder head 3 is fixed onto the cylinder block 1 and a combustion chamber 4 is formed between the piston 2 and the cylinder head 3. An intake valve 5 is located in a helically-shaped intake port 6 formed in the cylinder head, an exhaust valve 7 is located in an exhaust port 8, and a spark plug 9 is located in the head 3 between the valves 5 and 7. An intake manifold 10, on which a carburetor 11 is mounted, has manifold branches 12 attached to the cylinder head. Each of the manifold branches 12 is connected to the corresponding intake port 6. As is illustrated in FIG. 2, a cylindrical projection 14, projecting downwardly for supporting a valve guide 13, is formed in one piece on the upper inner wall of the helically-shaped intake port 6, and the tip of the valve guide 13 projects from the tip of the cylindrical projection 14. At the time of the intake stroke, the mixture formed in the carburetor 11 (FIG. 1) is introduced into the combustion chambers 4 via the intake manifold 10, the manifold branches 12, the helically-shaped intake ports 6 and the intake valves 5 and is ignited by the spark plug 9 at the end of the compression stroke.

Figure 4:
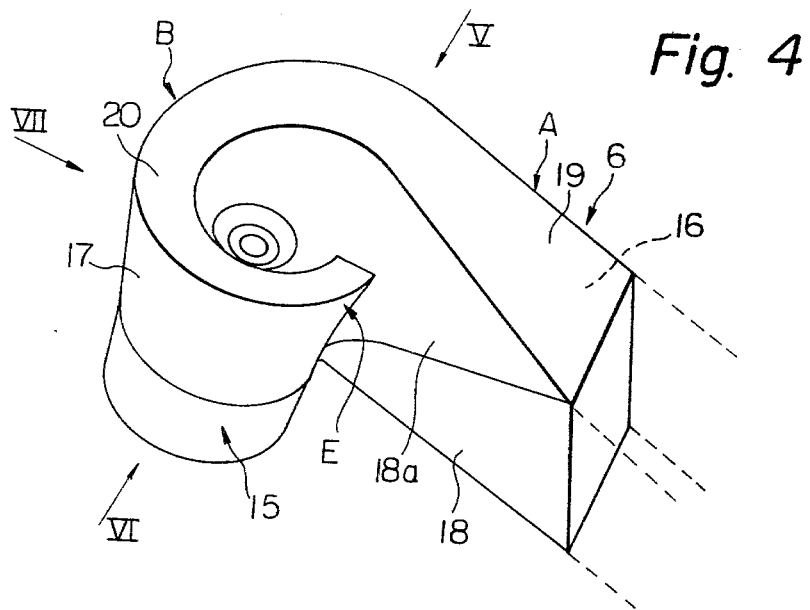
FIG. 4 is a perspective view of a helical shaped intake port schematically illustrating the helical shaped intake port illustrated in FIG. 2.
Figure 5:
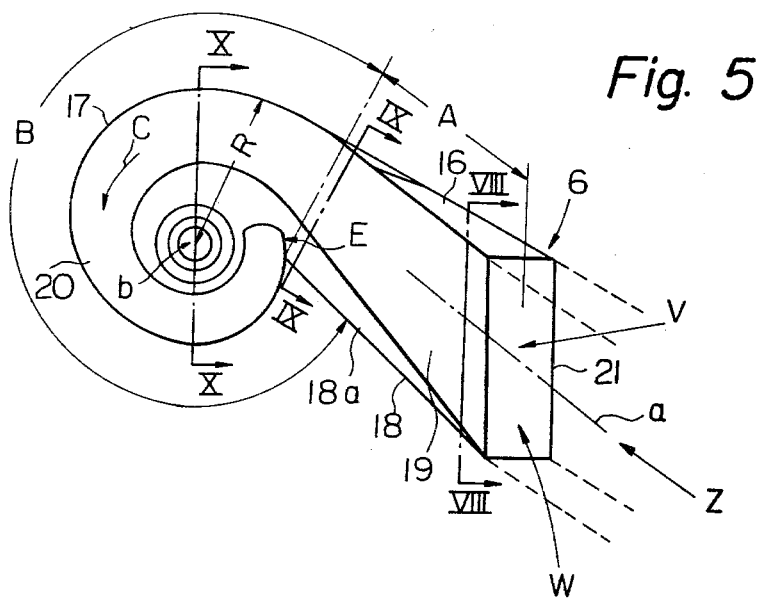
FIG. 5 is a plan view in the direction of the arrow V in FIG. 4.
Figure 6:
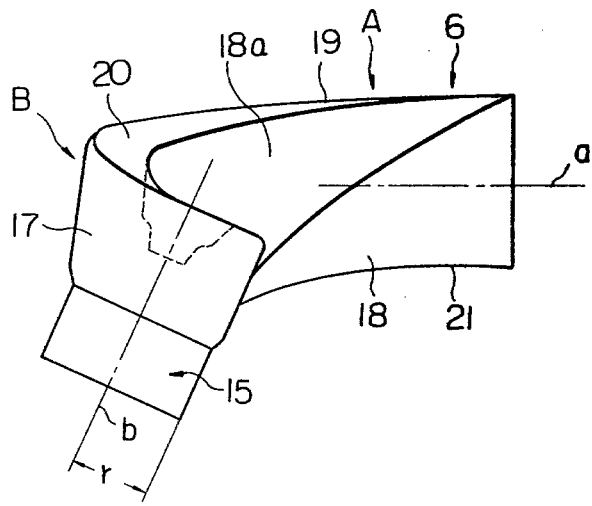
FIG. 6 is a side view in the direction of the arrow VI in FIG. 4.
Figure 7:
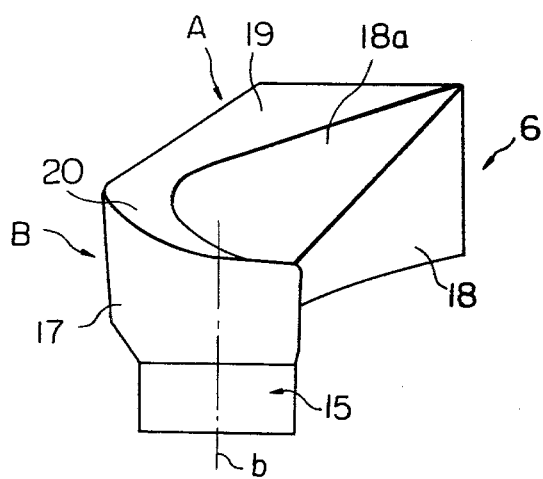
FIG. 7 is a side view in the direction of the arrow VII in FIG. 4.
Figure 8:
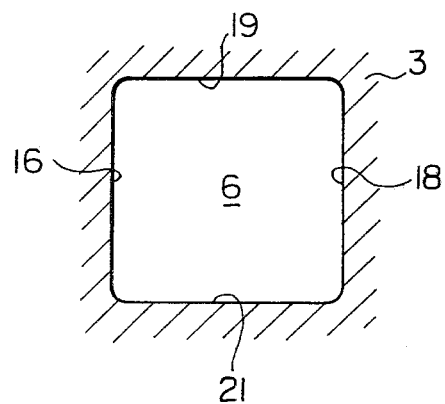
FIG. 8 is a cross-sectional view taken along the line VIII—VIII in FIG. 5.
Figure 10:
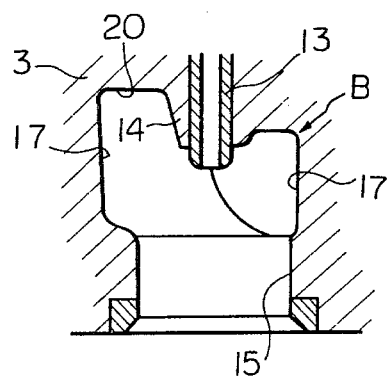
FIG. 10 is a cross-sectional view taken along the line X—X in FIG. 5.

FIGS. 4 through 7 schematically illustrate the shape of the helically-shaped intake port 6 illustrated in FIG. 2. As is illustrated in FIG. 5, the helically-shaped intake port 6 comprises an inlet passage portion A extending substantially straight along the longitudinal central axis a thereof, and a helical portion B. The open inlet end of the inlet passage portion A has a rectangular cross-section (FIG. 8), and the mixture outlet portion 15 (FIG. 4) of the helical portion B has a cylindrical inner wall which extends circumferentially about the helix axis b of the helical portion B. As illustrated in FIG. 2, the helix axis b, that is, the axis of the intake valve 5, is inclined by approximately 23 degrees with respect to the axis of the cylinder, and the inlet passage portion A extends substantially horizontally. The side wall 16 of the inlet passage portion A, which is located remote from the helix axis b, is arranged so as to be substantially vertical and is smoothly connected to the side wall 17 of the helical portion B, which extends circumferentially about the helix axis b. As illustrated in FIGS. 7 and 10, the side wall 17 of the helical portion B is so formed that it expands outwards from the cylindrical inner wall of the mixture outlet portion 15. In addition, as is illustrated in FIG. 5, the side wall 17 is so formed that the distance R between the side wall 17 and the helix axis b is maintained constant at a position near the inlet passage portion A and is gradually reduced along the helical direction C. The distance R becomes approximately equal to the radius of the cylindrical inner wall of the mixture outlet portion 15 (FIG. 4) at the helix terminating portion E.

Figure 9:
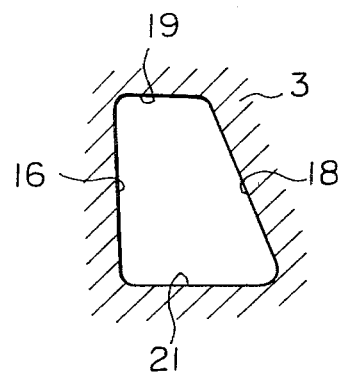
FIG. 9 is a cross-sectional view taken along the line IX—IX in FIG. 5.

As is illustrated in FIGS. 4 and 5, the side wall 18 of the inlet passage portion A, which is located near the helix axis b, has on its upper portion an inclined wall portion 18a which is arranged to be directed downwards. The width of the inclined wall portion 18a is gradually increased towards the helical portion B and, as is illustrated in FIGS. 5 and 9, the entire portion of the side wall 18 is inclined at the connecting portion of the inlet passage portion A and the helical portion B. The upper half of the side wall 18 is smoothly connected to the circumferential wall of the cylindrical projection 14 (FIG. 2), and the lower half of the side wall 18 is connected to the side wall 17 of the helical portion B at the helix terminating portion E of the helical portion B.

As is illustrated in FIGS. 2 and 6, the upper wall 19 of the inlet passage portion A extends substantially horizontally from the open inlet end of the inlet passage portion A towards the helical portion B and is smoothly connected to the upper wall 20 of the helical portion B. This upper wall 20 gradually descends along the helical direction C (FIG. 4) and is connected to the side wall 18 of the inlet passage portion A. Since the inclined wall portion 18a of the inlet passage portion A is so formed that the width thereof is gradually increased towards the helical portion B as mentioned above, the width of the upper wall 19 of the inlet passage portion A is gradually reduced. In addition, as illustrated in FIG. 5, since the side wall 17 of the helical portion B is so formed that the distance R between the side wall 17 and the helical axis b is maintained constant at a position near the inlet passage portion A and is gradually reduced along the helical direction C as mentioned above, the width of the upper wall 20 of the helical portion B is gradually reduced along the helical direction C. Consequently, it will be understood that the upper wall 19 of the inlet passage portion A extends substantially horizontally towards the helical portion B, while the width of the upper wall 19 is gradually reduced, and that the upper wall 20 of the helical portion B gradually descends along the helical direction C, while the width of the upper wall 20 is gradually reduced.

As is illustrated in FIGS. 2 and 6, the bottom wall 21 of the inlet passage portion A extends substantially horizontally in parallel with the upper wall 19 towards the helical portion B and is connected to the cylindrical inner wall of the mixture outlet portion 15 via a smoothly curved wall 22 as illustrated in FIG. 2. From FIG. 5, it will be understood that the width of the bottom wall 21 is gradually reduced towards the helical portion B.

Figure 3:
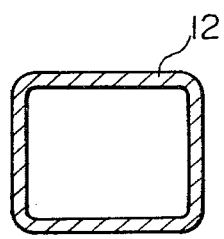
FIG. 3 is a cross-sectional view taken along the line III—III in FIG. 1.

As is illustrated in FIG. 1, the intake manifold 10 has a pair of mixture passages 10a, 10b, and the mixture passages 10a, 10b are divided into four manifold branches 12. As illustrated in FIGS. 1 and 2, each of the manifold branches 12 extends substantially straight along the longitudinal central axis a of the inlet passage portion A of the corresponding helically-shaped intake port 6 and has a rectangular cross-section as illustrated in FIG. 3.

In addition, in the embodiment illustrated in FIG. 1, if the length of a substantially straight intake passage portion, that is, the distance between the branching off point P of the manifold branches 12 and the connecting point Q of the inlet passage portion A and the helical portion B, is indicated by X, and if the cross-sectional area of the inlet passage portion A at the inlet open end G is indicated by S, the intake manifold 10 is so constructed that the value of X/S is greater than 0.7 cm$^{-1}$. Furthermore, referring to the No. 1 cylinder H and the No. 2 cylinder J, it will be understood that the intake valves 5, the intake ports 6, the manifold branches 12, the exhaust valves 7 and the spark plugs 9 are arranged symmetrically to each other with respect to the straight line Y, which is perpendicular to the longitudinal axis of the cylinder head 3. In addition, a substantially straight end portion M of the mixture passage 10a, which is connected to the manifold branches 12, is arranged to extend along the straight line Y.

In operation, the mixture formed in the carburetor 11 is fed into the inlet passage portions A via the mixture passages 10a, 10b and the manifold branches 12. Then, a part of the mixture introduced into the inlet passage portion A moves forward along the upper walls 19 and 20, as illustrated by the arrow K in FIG. 2, and the remaining part of the mixture impinges upon the inclined wall portion 18a and is deflected dowwnwards. As a result, the reamining part of the mixture flows into the mixture outlet portion 15 without swirling, as illustrated by the arrow L in FIG. 2. Since the widths of the upper walls 19 and 20 are gradually reduced towards the flow direction of the mixture as mentioned above, the cross-section of the flow path of the mixture flowing along the upper walls 19 and 20 is gradually reduced towards the flow direction of the mixture. In addition, since the upper wall 20 gradually descends along the helical direction C, the mixture flowing along the upper walls 19 and 20 is deflected downwards, while the velocity thereof is gradually increased. As a result of this, a swirl motion moving downwards while swirling is created in the helical portion B and, in addition, this swirl motion causes a swirl motion of the mixture flowing into the mixture outlet portion 15, as illustrated by the arrow L in FIG. 2. Then, the mixture moves downwards while smoothly swirling along the cylindrical inner wall of the mixture outlet portion 15 and, thus, a strong swirl motion rotating about the helix axis b is created within the mixture outlet portion 15. Then, this swirling mixture flows into the combustion chamber 4 via the valve gap formed between the intake valve 5 and its valve seat and causes a strong swirl motion in the combustion chamber 4.

In addition, by forming the inclined wall portion 18a as mentioned previously, since a part of the mixture introduced into the inlet passage portion A flows into the mixture outlet portion 15 along the smoothly curved wall 22 without swirling, the flow resistance which the mixture flowing in the helically-shaped intake port 6 is subjected to becomes quite small as compared with that in a conventional helically-shaped intake port. As a result of this, a high volumetric efficiency can be ensured when the engine is operating at a high speed under a heavy load.

In the helically-shaped intake port 6, as illustrated in FIG. 2, the mixture flowing along the upper walls 19, 20 greatly contributes to the creation of a swirl motion and, in addition, the presence of the inclined wall portion 18a greatly contributes to the improvement in volumetric efficiency. Consequently, if the mixture were caused to flow into the inlet passage portion A towards the inclined wall portion 18a as illustrated by the arrow V in FIG. 5, a large part of the mixture would be deflected. As a result of this, since a large part of the mixture would flow into the mixture outlet portion 15 without swirling, it would be impossible to create a strong swirl motion when the engine is operating at a low speed. Contrary to this, if the mixture were caused to flow into the inlet passage portion A towards the side wall 16 as illustrated by the arow W in FIG. 5, since a large part of the mixture flows along the upper walls 19, 20, a strong swirl motion could be obtained. However, under such conditions, since the downwardly deflecting operation of the mixture, which is caused by the inclined wall portion 18a, would become weak, a reduction of the volumetric efficiency would be caused when the engine is operating at a high speed under a heavy load.

Consequently, in order to ensure the creation of a strong swirl motion when the engine is operating at a low speed and, at the same time, in order to ensure the improvement in the volumetric efficiency when the engine is operating at a high speed under a heavy load, it is necessary to cause the mixture to flow into the inlet passage portion A along the longitudinal central axis $\underline{a}$ as illustrated by the arrow Z in FIG. 5. In order to cause the mixture to flow into the inlet passage portion A along the longitudinal central axis $\underline{a}$ as mentioned above, it is necessary to cause the mixture to flow along the longitudinal central axis $\underline{a}$ for a certain distance until the mixture flows into the inlet passage portion A. To this end, as illustrated in FIG. 1, each of the manifold branches 12 is arranged to extend along the longitudinal central axis a of the inlet passage portion A. Based on experiments conducted by the inventor, it has been proven that, if the length X of the substantially straight intake passage portion is greater than 8.5 cm in the case wherein the cross-sectional area of the inlet passage portion A at the inlet open end G is about 12 cm$^2$, a strong swirl motion can be created while ensuring a high volumetric efficiency. In addition, it has been also proven that, by symmetrically arranging the intake valves 5, the intake ports 6 and the manifold branches 12 of the No. 1 and the No. 2 cylinders H and J with respect to the straight line Y, a swirl motion having a uniform strength can be created in each cylinder.

According to the present invention, it is possible to create a strong swirl motion in the combustion chamber when an engine is operating at a low speed, while ensuring a high volumetric efficiency when an engine is operating at a high speed under a heavy load. In addition, since a swirl motion having a uniform strength is created in each cylinder, the occurence of irregularity of the combustion in each cylinder can be prevented.

While the invention has been described by reference to a specific embodiment chosen for purposes of illustration, it should be apparent that numerous modifications could be made thereto by those skilled in the art without departing from the spirit and scope of the invention.

What is claimed is:

1. An internal combustion engine comprising a cylinder head partially defining a combustion chamber, said cylinder head comprising at least one helically-shaped intake port to direct intake gas to said chamber, said intake port comprising a helical portion having an open outlet end and an intake valve arranged at said outlet end, said helical portion being defined by an upper wall and a peripheral side wall which extends circumferentially about the axis of said intake valve, and a substantially straight inlet passage portion tangentially connected to said helical portion and having an open inlet end, said inlet passage portion being defined by an upper extension of said upper wall, a bottom wall, a first side wall located near the axis of said intake valve, and a second side wall arranged at a position more remote from the axis of said intake valve than the first side wall and connected to the peripheral side wall of said helical portion, said first side wall comprising a portion sloped inwardly toward said second side wall, said side wall increasing in width toward said helical portion and intersecting said upper wall closer to said second side wall in a region closer to said helical portion than in a region closer to said inlet end to reduce the cross-sectional size of the inlet passage portion adjacent to said helical portion and to deflect at least part of said gas toward said combustion chamber; and an intake manifold comprising a manifold inlet portion and a substantially straight manifold outlet portion connected to, and in line with, the inlet end of said inlet passage portion, the ratio of the sum of the length of said inlet passage portion and the length of said manifold outlet portion to the cross-sectional area of said inlet end being above 0.7 cm$^{-1}$.

2. An internal combustion engine as claimed in claim 1, wherein said engine comprises at least a second cylinder, each of said cylinders having one of said helically-shaped intake ports, said manifold outlet portion comprising at least a second one of said manifold branches branched off from said manifold inlet portion.

3. An internal combustion engine as claimed in claim 2, wherein the axes of said cylinders are in a first plane and are arranged symmetrically to each other with respect to a second place perpendicular to said first plane, said intake valves, said helically-shaped intake ports and said manifold branches of said cylinders being arranged symmetrically to each other with respect to said second plane.

4. An internal combustion engine as claimed in claim 3, wherein said manifold inlet portion has an end portion connected to said manifold branches and extending substantially straight along said perpendicular plane.

5. An internal combustion engine as claimed in claim 1, wherein said first side wall is entirely inclinded at the location where said inlet passage portion is tangentially connected to said helical portion.

6. An internal combustion engine as claimed in claim 1, wherein the width of the upper wall of said helical portion is gradually reduced along a flow direction of gas into said combustion chamber.

7. An internal combustion engine as claimed in claim 6, wherein the upper wall of said helical portion gradually descends towards the flow direction of the gas.

8. An internal combustion engine as claimed in claim 1, wherein said helically-shaped intake port further comprises a valve guide projecting into said helical portion from the upper wall of said helical portion and having a circumferential wall, the upper part of said first side wall being tangentially connected to the circumferential wall of said valve guide, the lower half of said first side wall being connected to the peripheral side wall of said helical portion.

9. An internal combustion engine as claimed in claim 1, wherein the second side wall of said inlet passage portion is substantially vertical.

10. An internal combustion engine as claimed in claim 1, wherein the bottom wall of said inlet passage portion is smoothly connected to an inner wall of said helical portion, which is located at a position near said outlet end.

* * * * *

UNITED STATES PATENT AND TRADEMARK OFFICE
CERTIFICATE OF CORRECTION

PATENT NO. : 4,286,554
DATED : September 1, 1981
INVENTOR(S) : Takamitsu Okamoto It is certified that error appears in the above—identified patent and that said Letters Patent is hereby corrected as shown below:

Col. 1, line 9, correct spelling of "combustion".

Column 6, line 53, Claim 5, correct spelling of "inclined".

Signed and Sealed this

Fifteenth Day of December 1981

[SEAL]

Attest:

GERALD J. MOSSINGHOFF

Attesting Officer   Commissioner of Patents and Trademarks